United States Patent Office 3,461,154
Patented Aug. 12, 1969

3,461,154
PREPARATION OF PHTHALIC ACID ESTERS
Pierre Yves Andre Lafont, Sainte-Foy-Les-Lyon, and Henri Francois Albert Menand, Saint-Fons, France, assignors to Rhone-Poulenc S.A., Paris, France, a corporation of France
No Drawing. Filed July 6, 1965, Ser. No. 469,901
Claims priority, application France, July 8, 1964, 981,115
Int. Cl. C07c 69/82
U.S. Cl. 260—475
9 Claims

ABSTRACT OF THE DISCLOSURE

Bis(hydroxyalkyl)phthalates are prepared by reacting a phthalic acid with an alkylene oxide in the presence of a tertiary phosphine catalyst.

---

This invention relates to the preparation of hydroxy-alkyl esters of phthalic acids, i.e. ortho-phthalic acid, iso-phthalic acid, and terephthalic acid.

It is known to prepare hydroxy-alkyl esters by the reaction of alkylene oxides with acids in an organic medium using tertiary amines as catalyst. By this method hydroxy-ethyl acrylates and methacrylates have been prepared, the reaction being carried out in an aromatic hydrocarbon, an ether, or an alcohol (see United States Patent No. 2,484,487). Hydroxy-alkyl terephthalates and isophthalates have also been obtained by this method, the reaction medium being an alcohol or a mixture of alcohols and ketones (see French Patent No. 1,224,687), or alternatively a ketone, ether, or alkyl-aromatic hydrocarbon (see French Patent No. 1,285,456). Of the hydroxy-alkyl phthalates, β-hydroxyethyl terephthalate is a particularly interesting compound. It can be readily converted into a polymer, but when the polymer is destined for use in the industrial manufacture of filaments and films, it is necessary to start from very pure monomer. Also, since the known process for the preparation of β-hydroxyethyl terephthalate does not give directly a product of sufficient purity, it is often necessary to carry out lengthy and costly purification procedures in order to obtain an ester of the requisite purity. This difficulty is especially important with esterification processes using tertiary amines as catalysts, since, in the presence of the acids, these amines form salts which give rise to difficulties in the separation of the esters obtained.

It has now been found that these disadvantages can be avoided if, in place of tertiary amines, triorganophosphines are used as catalyst. Moreover, it has been found that the products obtained using such phosphine catalysts resist prolonged exposure to heat better than those obtained using amine catalysts.

According, therefore, to the present invention, a process for the preparation of a hydroxy-alkyl ester of a phthalic acid comprises reacting a phthalic acid with an alkylene oxide, generally in an organic medium, in the presence of, as catalyst, a triorganophosphine. The phosphine can be aliphatic, cycloaliphatic, aromatic or mixed aliphatic and aromatic. The preferred phosphines are those of the formula $PR_1R_2R_3$, where $R_1$, $R_2$ and $R_3$ are the same or different and each is phenyl or alkyl of 1 to 6 carbon atoms, especially tributylphosphine and diethyl-phenylphosphine.

It is surprising that such phosphines can be utilised as catalysts in a reaction involving the use of alkylene oxide, as it is known that alkylene oxides and phosphines react together on heating. Thus, tributylphosphine reacts with butylene oxide giving butene and tributyl phosphine oxide (see Chem. and Ind., 330, 1959).

The quantity of phosphine used as catalyst may be from 0.5 to 5% by weight of the phthalic acid used as starting material. The esterification is normally carried out in a diluent inert under the operating conditions. Various organic compounds can be used for this purpose. In particular, it is possible to use aromatic hydrocarbons such as benzene, toluene, and xylene, saturated aliphatic ethers such as diisopropyl ether, inert cyclic ethers such as dioxane, ketones such as methylethylketone, diethylketone and methylisobutylketone, alcohols such as methanol, ethanol and isopropanol, as well as mixtures of these various solvents.

The process of the invention can be operated with any alkylene oxide, but is especially useful in connection with alkylene oxides of the formula:

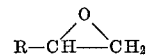

(where R is alkyl of 1 to 4 carbon atoms), preferably ethylene oxide and propylene oxide. While any phthalic acid can be used as starting material, the invention is especially valuable in connection with the production of esters of terephthalic acid. The molecular proportion of alkylene oxide to phthalic acid in the starting mixture is ordinarily 2:1 or a little greater than this.

The esterification is carried out in manner known per se by mixing the acid and the alkylene oxide in the chosen organic medium in the presence of the catalyst. Preferably, the reaction mixture is heated under pressure to a temperature between 100 and 150° C. Desirably oxygen is kept away from the heated reaction mixture.

Depending upon the nature of the organic medium used, the hot reaction product may be a solution or a suspension. In the first case, it is slowly cooled, and the phthalic acid which has not reacted (especially if this acid is terephthalic acid) and is less soluble than the corresponding hydroxyalkyl ester, precipitates. This unreacted acid is separated by filtration of the mixture while it is still hot. The filtrate is then further cooled so as to cause the hydroxyalkyl ester to precipitate, and the latter is also separated by filtration. When the reaction product is a suspension, the solid is filtered off, taken up with water, and separated by fractional crystallisation into unreacted phthalic acid and hydroxyalkyl ester, the former being less soluble than the latter.

The following examples, in which percentages are by weight and temperatures are in ° C., illustrate the invention.

EXAMPLE 1

Terephthalic acid (50 g.) and a solution of ethylene oxide (27 g.) and tributyl phosphine (3.1 g.) in isopropanol (200 cm.³) are introduced into a 500 cm.³ stainless steel autoclave placed in a shaking frame. The autoclave is then purged with nitrogen, and nitrogen is introduced to establish a pressure of 15 bars. With agitation, the temperature in the autoclave is raised to 110° and kept at this figure for 4 hours with continued agitation. The reaction mixture is then allowed to cool with continued agitation to 60°, and filtered at this temperature to eliminate unreacted terephathalic acid (2.4 g., or 4.8% of the acid used as starting material). Cooling is continued, and bis(hydroxyethyl) terephthalate begins to precipitate at 54°. By filtration at 5°, 49.1 g. of the ester are obtained, M.P. 108.8 to 109.4°. By concentration of the filtrate, a further 21.5 g. of the diester is obtained, M.P. 92° and of 89.1% purity.

EXAMPLE 2

The reaction is carried out as in Example 1, but replacing the isopropanol by an equal volume of methylethylketone and heating the reaction mixture for only 2 hours.

After filtration hot to separate the unreacted terephthalic acid (3.4 g., or 6.8% of the starting material), followed by further cooling of the filtrate to induce crystallisation, bis(hydroxyethyl) terephthalate (60.5 g.), M.P. 107–108.2% and of 97.7% purity, is obtained. 7.8 g. of diester, M.P. 100–102° and of 92.6% purity, can be recovered from the mother liquor.

EXAMPLE 3

The reaction is carried out as in Example 1, but replacing the isopropanol by an equal volume of toluene. After the reaction, a product insoluble in toluene is obtained. The mixture is cooled and filtered, and the solid residue is taken up in water (220 cm.$^3$) and heated to remove traces of toluene as the binary azeotrope, and to cause the solution to crystallise. Terephthalic acid (5.2 g.), M.P. 167–168°, is recovered, followed by a first fraction of bis(hydroxyethyl) terephthalate (57.8 g.), M.P. 106.6 to 107.4° and of 99.1% purity, and a second fraction of 8.8 g. of the diester, M.P. 82° and appreciably less pure.

EXAMPLE 4

The reaction is carried out as in Example 2, but replacing the tributylphosphine by phenylidethylphosphine (2.5 g.). 0.8 g. of terephthalic acid is recovered, and the first fraction of bis(hydroxyethyl) terephthalate (65.6 g.) melts at 107.2 to 108.2° and is of 97.96% purity. The second fraction of the diester weighs 9.3 g., melts at 94 to 96°, and is 89.2% purity.

We claim:

1. Process for the preparation of a bis(hydroxyalkyl) phthalate which comprises reacting a phthalic acid with a lower alkylene oxide in an inert organic diluent medium under pressure and at an elevated temperature in the presence of, as catalyst, a phosphine of formula $PR_1R_2R_3$, where $R_1$, $R_2$ and $R_3$ are the same or different and are each phenyl or alkyl of 1 to 6 carbon atoms.

2. Process according to claim 1, in which the alkylene oxide is ethylene oxide or propylene oxide.

3. Process according to claim 1, in which the phthalic acid is terephthalic acid.

4. Process according to claim 1, in which the reaction mixture comprises 0.5 to 5% of the catalyst, based on the weight of the phthalic acid starting material.

5. Process according to claim 1, in which the reaction is carried out at 100° to 150° C. under pressure.

6. Process according to claim 1, in which the molecular ratio of alkylene oxide to phthalic acid is substantially 2 to 1.

7. Process according to claim 1, in which the catalyst is tributylphosphine or diethylphenylphosphine.

8. Process for the production of bis(hydroxyethyl) terephthalate which comprises reacting ethylene oxide with terephthalic acid in an inert organic diluent medium under pressure and at 100–150° C. in the presence of, as catalyst, tributylphosphine or diethylphenylphosphine, the molecular ratio of ethylene oxide to terephthalic acid being substantially 2:1.

9. A process according to claim 8, wherein the reaction mixture comprises 0.5 to 5% of the catalyst, based on the weight of the terephthalic acid.

References Cited

UNITED STATES PATENTS

| | | | |
|---|---|---|---|
| 3,360,545 | 12/1967 | Wygant | 260—485 |
| 2,776,985 | 1/1957 | McKinnis | 260—475 |

FOREIGN PATENTS

| | | |
|---|---|---|
| 1,224,687 | 2/1960 | France. |
| 1,285,456 | 1/1960 | France. |

OTHER REFERENCES

Boskins et al., Chem. and Ind., 330, 1959.

JAMES A. PATTEN, Primary Examiner

E. J. SKELLY, Assistant Examiner